United States Patent
Woleben et al.

(10) Patent No.: US 8,175,550 B2
(45) Date of Patent: *May 8, 2012

(54) METHOD AND APPARATUS FOR INTERFERENCE MITIGATION BY REMOVING A PORTION OF THE TRANSMIT SIGNAL

(75) Inventors: Samuel M. Woleben, Lenexa, KS (US); Mark L. Yarkosky, Overland Park, KS (US); Robert C. Pippert, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,578

(22) Filed: Jun. 27, 2011

(65) Prior Publication Data

US 2011/0255628 A1    Oct. 20, 2011

Related U.S. Application Data

(63) Continuation of application No. 11/971,674, filed on Jan. 9, 2008, now Pat. No. 8,000,660.

(51) Int. Cl.
H04B 1/04    (2006.01)

(52) U.S. Cl. .................. 455/114.2; 455/296; 455/302

(58) Field of Classification Search ............ 455/63.1, 455/67.11, 67.13, 67.7, 69, 112, 113, 114.1, 455/114.2, 114.3, 118, 125, 249.1, 278.1, 455/296, 297, 298, 299, 300, 301, 302, 303, 455/304, 305, 306, 307, 308, 309, 310
See application file for complete search history.

(56) References Cited

U.S. PATENT DOCUMENTS

| | | | |
|---|---|---|---|
| 7,734,311 B2 * | 6/2010 | Satou | 455/553.1 |
| 2005/0032485 A1 * | 2/2005 | Bachman et al. | 455/114.2 |

* cited by examiner

Primary Examiner — Ping Hsieh

(57) ABSTRACT

Elimination of intermodulation interference in a wireless communication system by removing a portion of the spectrum of transmitted signals. According to a received indication of an occurrence of intermodulation interference experienced by a narrowband receiver, mappings are performed between the predetermined narrowband channel frequency on which the narrowband receiver operates and the occupied channel frequencies of at least one broadband transmit signal. Narrowband candidate frequency ranges that linearly combine into frequencies that overlap the predetermined narrowband channel frequency are determined based on the mappings. The narrowband candidate frequency ranges that potentially contribute to the intermodulation interference are then selectively filtered by at least one notch filter until the intermodulation interference is substantially eliminated.

10 Claims, 6 Drawing Sheets

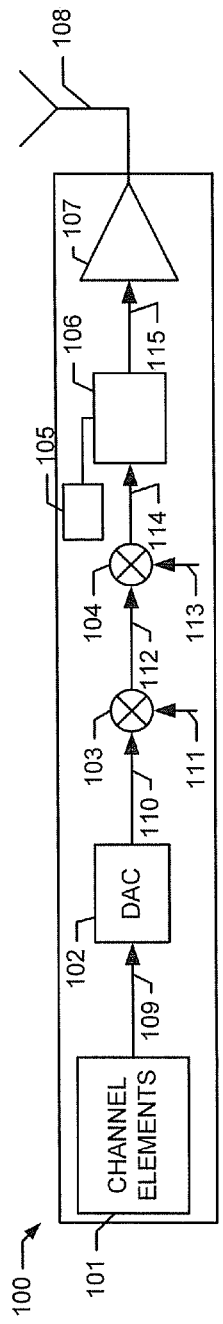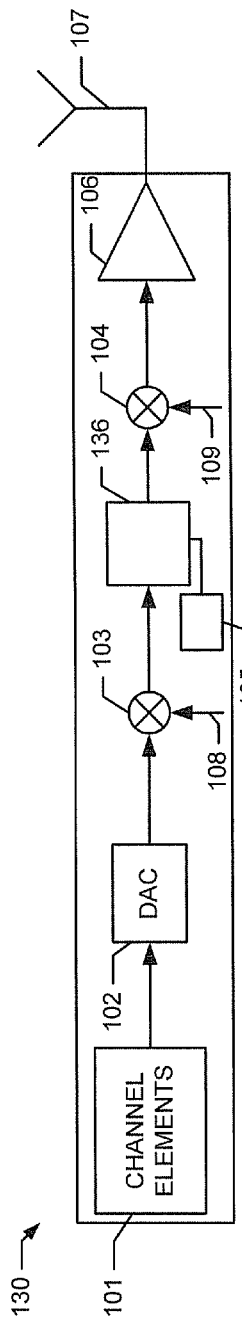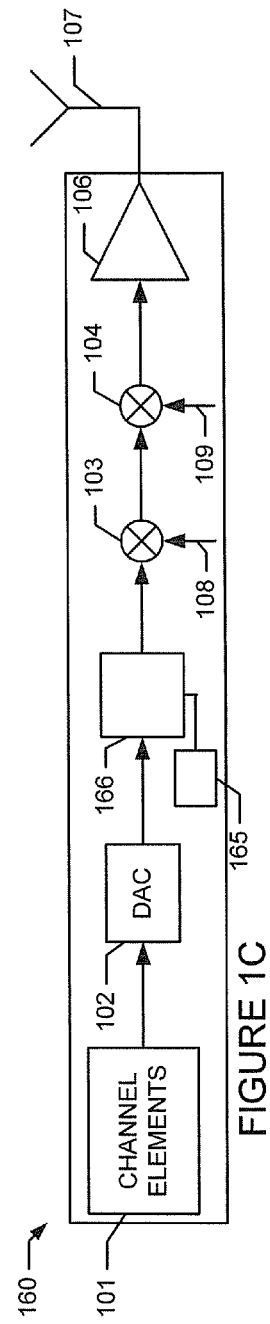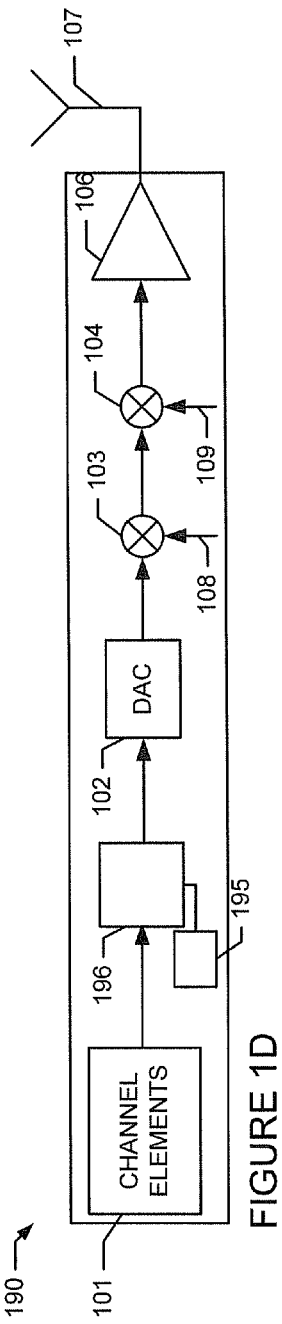
FIGURE 1A
FIGURE 1B
FIGURE 1C
FIGURE 1D

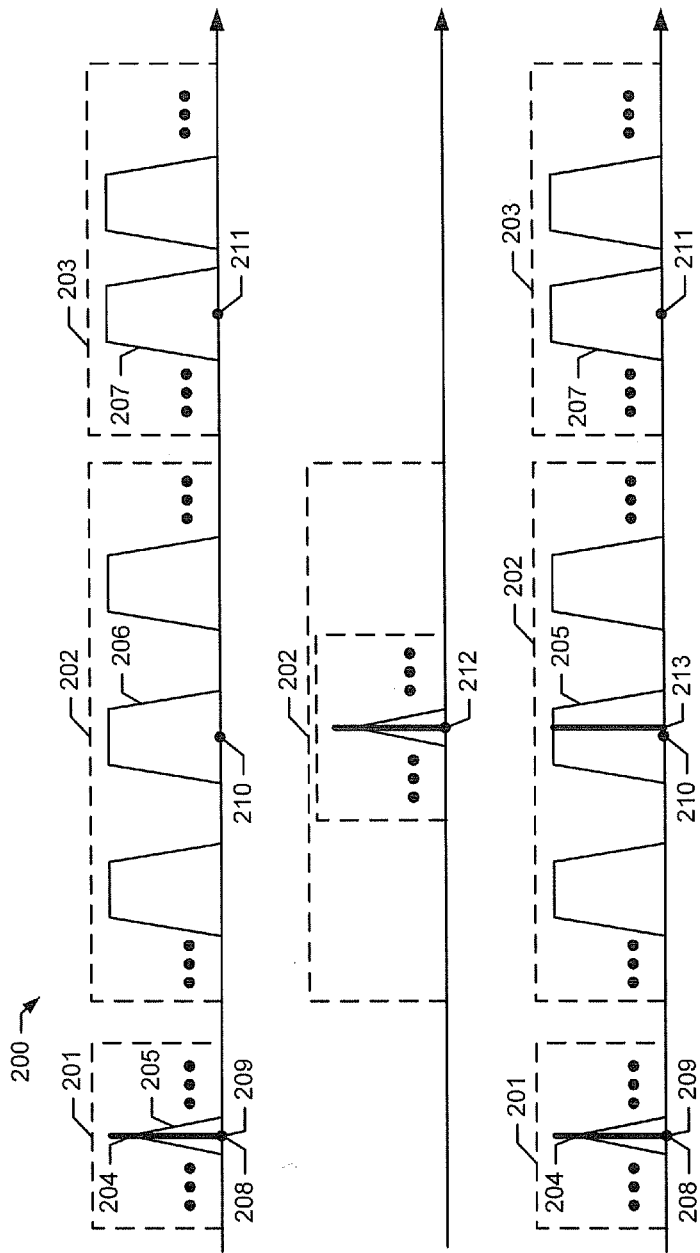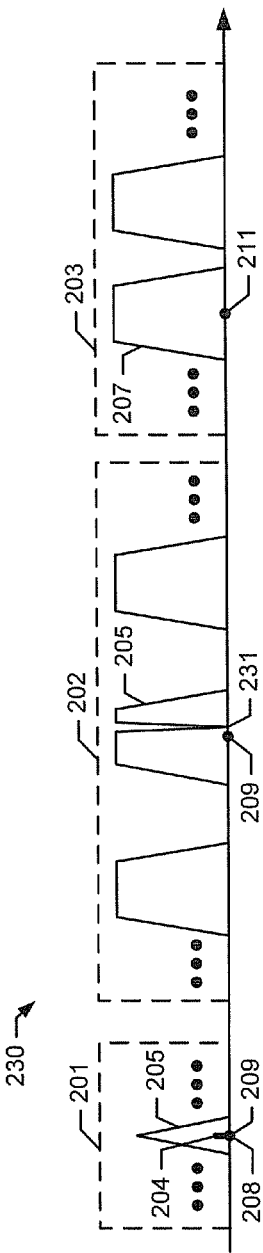
FIGURE 2A
FIGURE 2B

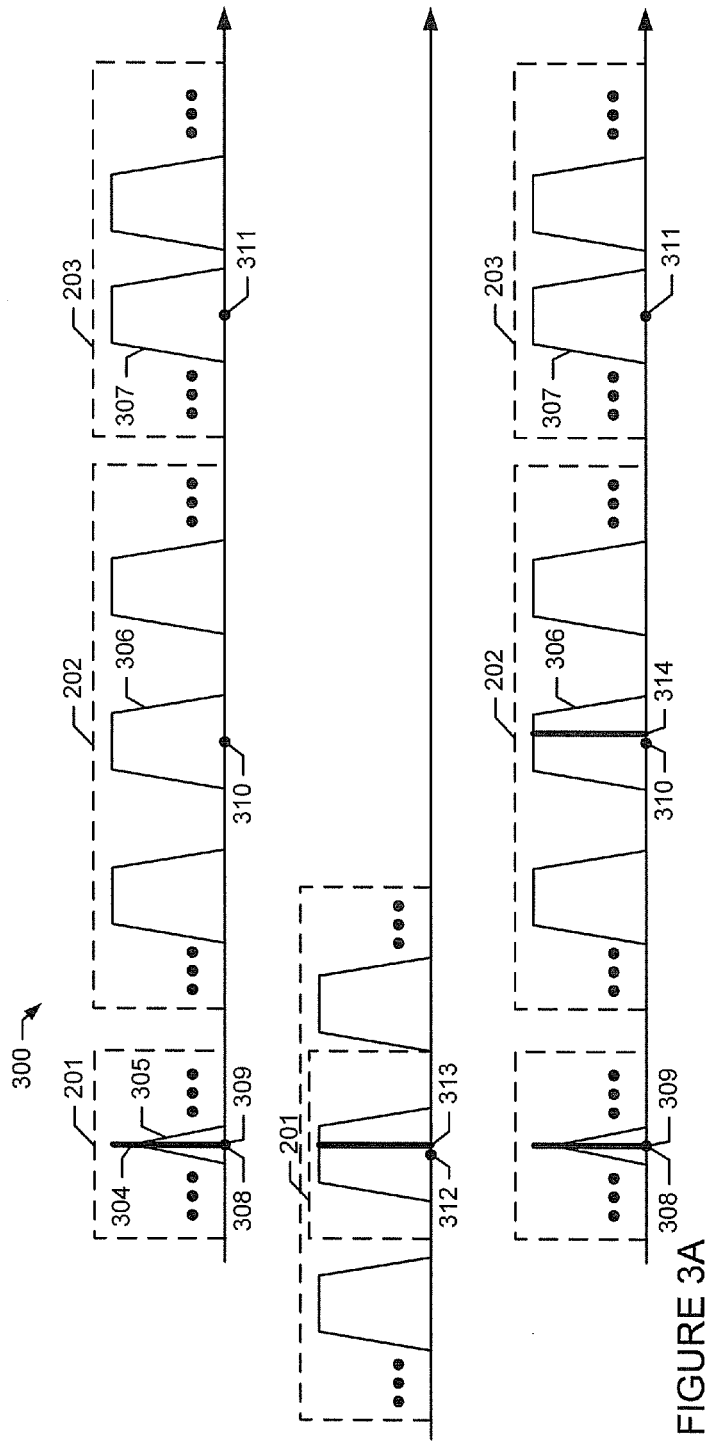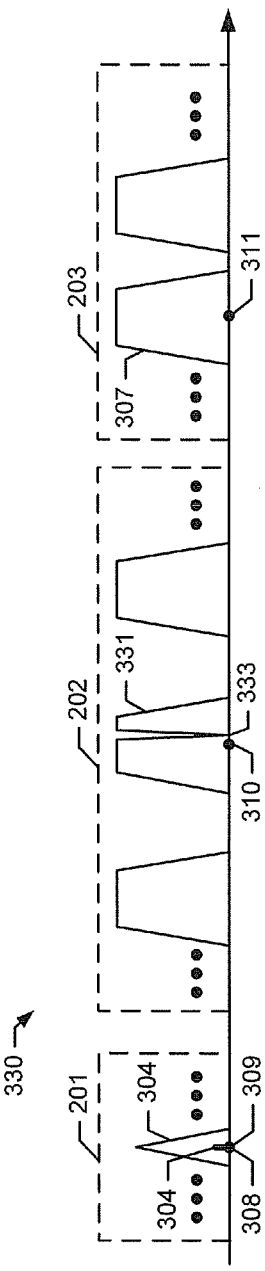
FIGURE 3A
FIGURE 3B

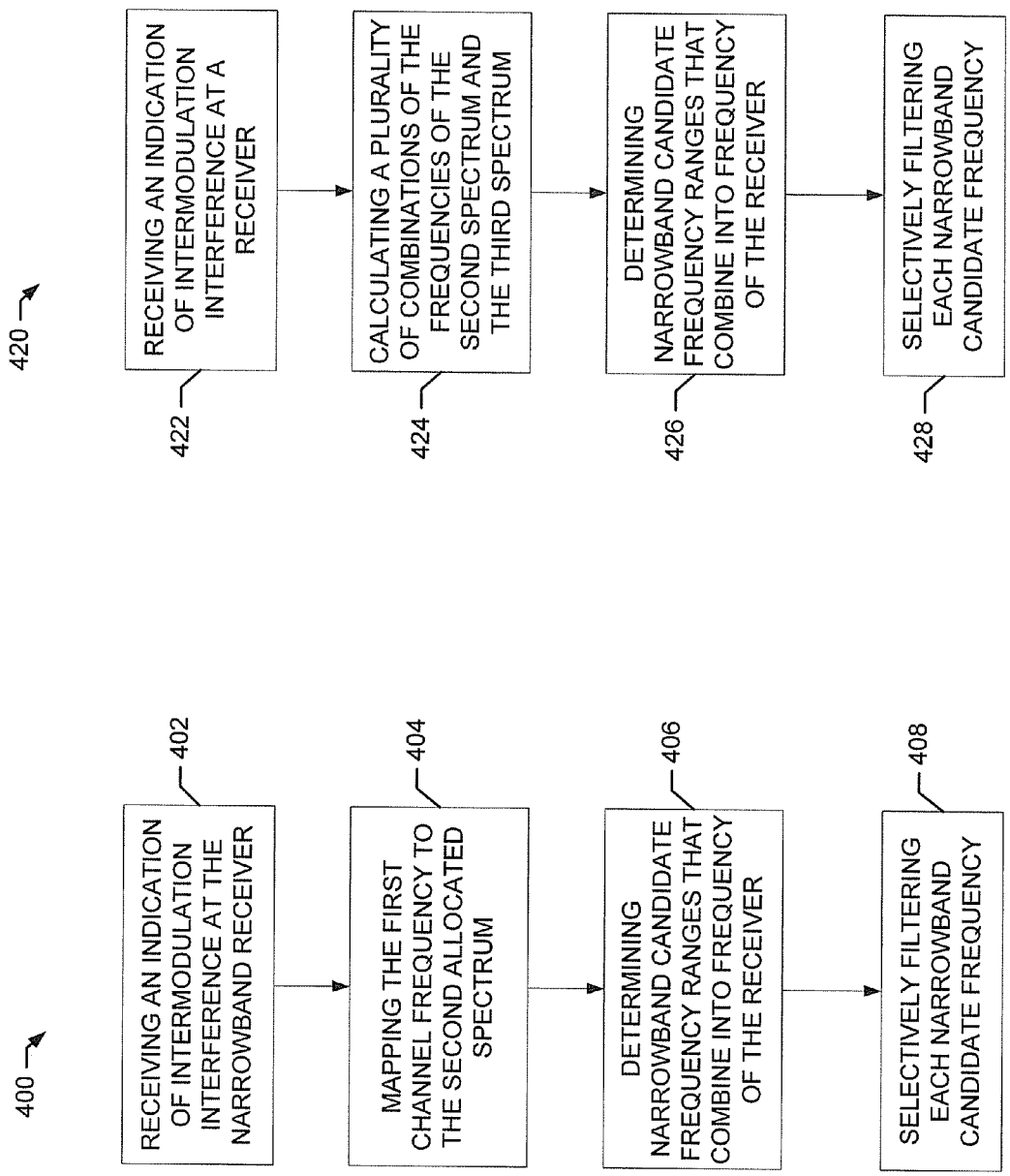

METHOD AND APPARATUS FOR INTERFERENCE MITIGATION BY REMOVING A PORTION OF THE TRANSMIT SIGNAL

REFERENCE TO RELATED APPLICATIONS

This is a continuation of U.S. patent application Ser. No. 11/971,674, filed Jan. 9, 2008, the entirety of which is hereby incorporated by reference.

BACKGROUND OF THE INVENTION

1. Field of the Invention

The invention described herein relates to methods and apparatus for eliminating intermodulation interference in a wireless communication system.

2. Description of the Related Art

Wireless communication systems depend on electromagnetic waves at various radio frequencies to transmit and receive information. For communication systems such as cellular phones, pagers, and cordless mobile phone, the usable radio frequency spectrum extends from about 300 MHz to 3000 MHz. This spectrum of radio frequencies used for wireless communication is further divided into individual bands wherein each band contains a range of frequencies. Each range of frequencies may be used differently and perform different functions. Furthermore, the radio frequency spectrum is shared by civilian, government, and military users according to International Telecommunications Union (ITU) radio regulations. For example, among these frequency ranges, the one between 806 MHz to 809 MHz is assigned to the National Public Safety Planning Advisory Committee (NPSPAC) to provide public safety mobile services, the one between 817 MHz to 824 MHz is licensed to Nextel Communication Inc. to provide enhanced specialized mobile radio (ESMR) services including voice and data dispatch applications, and the one between 824 MHz to 849 MHz is assigned to various cellular phone service providers to provide commercialized cellular phone services.

SUMMARY OF THE INVENTION

Described herein are methods and systems for eliminating intermodulation interference in a wireless communication system by removing a portion of the spectrum of transmitted signals. As wireless communication systems transmit and receive radio waves, harmonic frequencies of radio signals are generated due to the nonlinear behavior of signal processing components that operate on the radio signals. These radio signals and their harmonics are combined into additional signals, forming intermodulation products at frequencies that may interfere with the reception of the desired signals. Intermodulation interference is highly undesirable in wireless communication systems, as it essentially creates spurious emissions, which can create severe distortions to other systems operating on the resulting frequencies, and indeed may prevent those systems from functioning properly.

According to an embodiment, an apparatus is provided including a base transceiver station with a radio signal transmitter transmitting at least one broadband transmit signal on a broadband channel frequency, and at least one notch filter for selectively reducing the energy of a narrow band frequency range within the broadband transmit signal, the narrowband frequency range being a range that when linearly combined with another channel frequency equals a predetermined narrowband channel frequency at which a narrowband receiver operates.

In one embodiment, a method is provided to receive an indication that a narrowband signal receiver operating on a first channel frequency in a first allocated spectrum is experiencing intermodulation interference caused in part by at least one broadband transmit signal from a radio signal transmitter operating on a second channel frequency in a second allocated spectrum; determining narrowband candidate frequency ranges within the at least one broadband transmit signal of the second channel that linearly combine into frequencies that overlap the first channel frequency; and, selectively filtering each narrowband candidate frequency range of the at least one broadband transmit signal until the intermodulation interference is substantially eliminated.

In one alternative embodiment, determining narrowband candidate frequency ranges may be performed by determining a mapping between the second allocated spectrum and the first allocated spectrum. The mapping maps the first channel frequency onto the second allocated spectrum based on linear combinations of the first channel frequency and channel frequencies in a third allocated spectrum.

In a further alternative embodiment, determining narrowband candidate frequency ranges may be performed by calculating a plurality of linear combinations of channel frequencies of occupied channels in the second allocated spectrum and occupied channels in a third allocated spectrum to determine those combinations that contain frequencies that overlap all or a part of the first channel frequency in the first allocated spectrum. The embodiment further comprises identifying in the second allocated spectrum frequencies corresponding to the linear combinations substantially equal to the frequency of the narrowband signal receiver.

These as well as other aspects, advantages, and alternatives will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

The objects, features and advantages of the present invention will be more readily appreciated upon reference to the following disclosure when considered in conjunction with the accompanying drawings, in which:

FIGS. 1A, 1B, 1C, and 1D depict various embodiments of the apparatus with a notch filter for intermodulation interference mitigation.

FIGS. 2A and 2B depict an embodiment wherein a mapping maps a first channel frequency onto the second allocated spectrum and the resulting spectra after the notch filter is applied.

FIGS. 3A and 3B depict an alternative embodiment wherein the frequencies of the second allocated spectrum are mapped to the predetermined narrowband channel frequency and the resulting spectrum after the notch filter is applied.

FIGS. 4A and 4B depict two embodiments of a method for intermodulation interference mitigation.

DETAILED DESCRIPTION OF THE PREFERRED EMBODIMENT

Figure 2C:
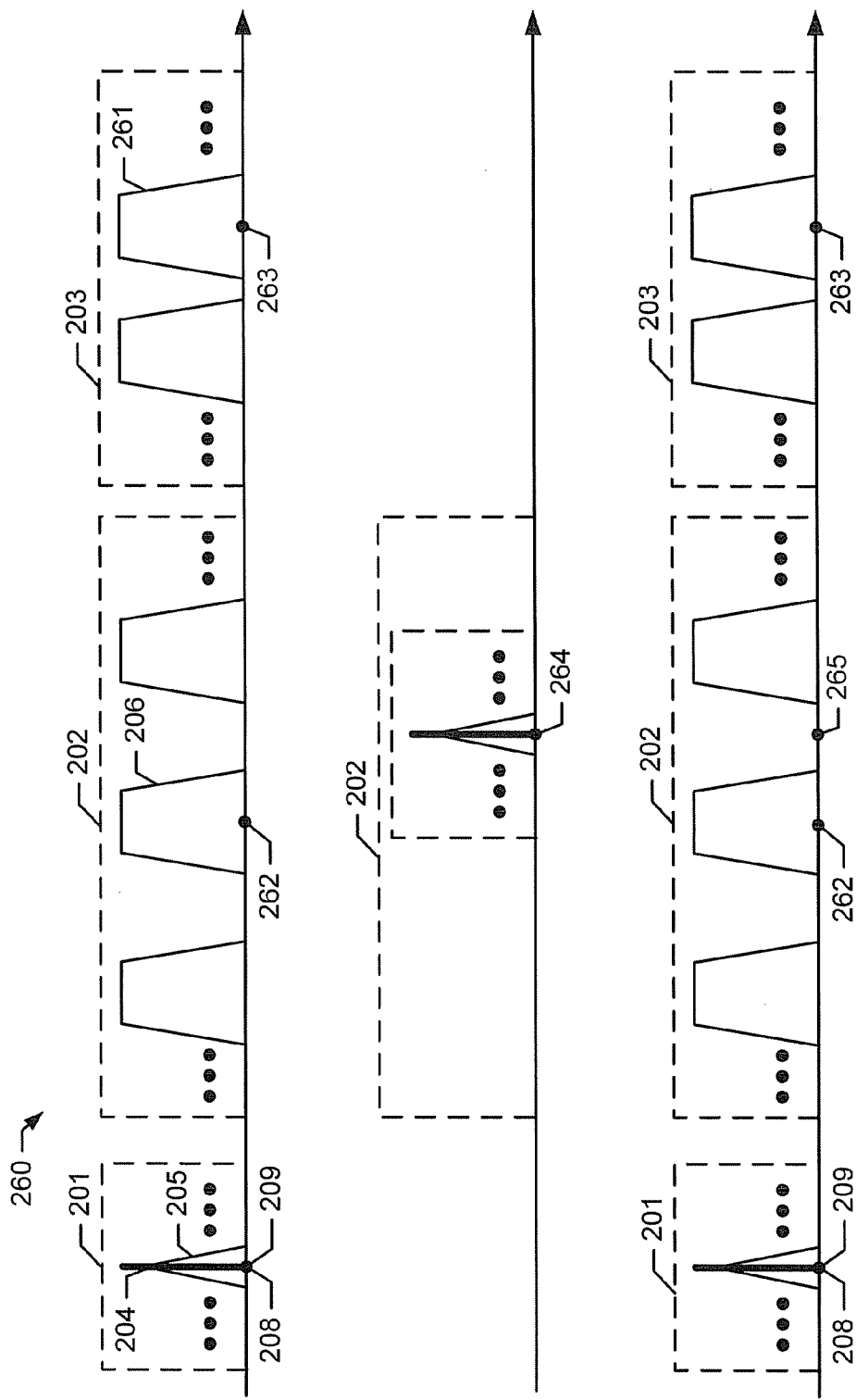
FIG. 2C depicts another embodiment wherein a mapping maps a first channel frequency into the second allocated spectrum.

The apparatuses and methods described herein are able to identify in a broadband transmit signal at least one frequency that causes intermodulation interference at a narrowband receiver and substantially mitigate the interference by removing a portion of the broadband transmit signal.

In some specific situations, operation of wireless services has the potential to create interference to other wireless services due to the generation of intermodulation products within the terminal devices. The methods described herein eliminate or mitigate this interference by removing the spectral portion of the transmit signal that has the potential for contributing to these intermodulation products.

In particular, one method is the use of a high power tunable narrow band filter to notch out small portions of the braodband transmit signal that could cause or contribute interference. Exemplary broadband transmit signals may include code division multiple access (CDMA), Orthogonal Frequency Division Multiple Access (OFDMA, such as WiMAX), or other broadband transmission formats. In particular, the CDMA air-interface is designed to tolerate two 30 kHz tones as interference and still demodulate the carrier signal. In some embodiments, the system and methods intentionally remove up to two 30 kHz portions of the carrier signal that have been identified as possibly contributing to intermodulation interference.

According to one embodiment shown in FIG. 1A, a base transceiver station with a radio signal transmitter 100 transmits at least one broadband transmit signal on a broadband channel frequency in a broadband cellular spectrum. The radio signal transmitter 100 includes a plurality of channel elements 101 that combine a plurality of signal sources into a baseband digital signal 109. The baseband digital signal 109 is input to a digital-to-analog converter (DAC) 102 that converts the baseband digital signal 109 into a baseband analog signal 110. The output of the DAC 102 is connected to an intermediate frequency mixer, or modulator, 103 that modulates the baseband analog signal 110 onto an intermediate frequency carrier 111 having an intermediate frequency $f_{IF}$ and forms an intermediate frequency signal 112. The output of the intermediate frequency modulator 103 is connected to a carrier frequency modulator 104 that converts the intermediate frequency signal 112 to a carrier frequency signal 114 using a radio frequency signal 113 having a frequency $f_c-f_{IF}$, wherein $f_c$ is a desired carrier frequency. The output of the carrier frequency modulator 104 is connected to at least one notch filter 106 that selectively removes the energy of a portion of the carrier frequency signal 114 and outputs a filtered signal 115. The output of the at least one notch filter 106 is connected to a power amplifier that drives the filtered signal 115 to a transmit antenna 108 that transmits the transmit signal. Alternatively, the at least one notch filter may be connected at the output of the power amplifier.

According to one embodiment, the at least one notch filter may be an analog radio frequency (RF) carrier filter. The center frequency of the at least one notch filter 106 may be adjusted up or down by a computer processor 105 running a computer program. Alternatively, the center frequency of the notch filter 106 may be adjusted manually by an operator operating the transmitter 100.

According to one embodiment, in operation, the radio signal transmitter 100 receives an indication of an occurrence of an intermodulation interference experienced at a narrowband receiver operating on a predetermined narrowband channel frequency. The indication may be a notification from an operator of the narrowband receiver that intermodulation interference exists at the narrowband receiver. The notification may include the specific channel or center frequency of the narrowband receiver.

The intermodulation interference has a frequency substantially equal to at least one linear combination of a narrowband frequency range within the at least one broadband transmit signal and another channel frequency. The term "linear combination" refers to a linear sum of frequencies such as $f_1+f_2$, or $f_1+2f_2$, etc., which result from non-linear distortion of the signals. Thus, the narrowband frequency range within the at least one broadband transmit signal when linearly combined with another channel frequency equals the predetermined narrowband channel frequency at which the narrowband receiver operates.

According to one embodiment, the radio signal transmitter 100 further comprises a computer utility to determine linear combinations of channel frequencies within the broadband cellular spectrum and another channel frequency wherein the linear combinations at least partially overlap the predetermined narrowband channel frequency. The computer utility further identifies in the at least one broadband transmit signal frequencies corresponding to linear combinations substantially equal to the predetermined narrowband channel frequency. The source of the intermodulation distortion, and the specific frequencies within the source, are identified so that they may then be removed at the transmitter.

According to an alternative embodiment shown in FIG. 1B, at least one notch filter 136 may be connected between the intermediate frequency (IF) modulator 108 and the carrier frequency modulator 104. In this embodiment, the at least one notch filter 136 may be an analog IF filter. According to a further alternative embodiment shown in FIG. 1C, the at least one notch filter 166 may be connected between the digital-to-analog converter (DAC) 102 and the IF modulator 108. In this embodiment, the at least one notch filter 166 may be an analog baseband filter. According to yet a further alternative embodiment shown in FIG. 1D, at least one notch filter 196 may be connected between the channel elements 101 or other digital signal source and the DAC 102. In this embodiment, the at least one notch filter 196 may be a digital IIR filter or a digital FIR filter, or may be implemented within the modulator to reduce the signal energy at the desired frequency. According to another embodiment, there may be a plurality of combinations of the at least one notch filter 106, the at least one notch filter 136, the at least one notch filter 166, and the at least one notch filter 196. The center frequency of each of the at least one notch filters 106, 136, 166, and 196 may be adjusted independently by a manual means or by a computer processing 105, 135, 165, and 195, respectively. The at least one notch filter may be connected in series or in parallel.

According to an alternative embodiment, the predetermined narrowband channel of the narrowband signal receiver may be a public safety channel. The broadband channel may be a CDMA cellular channel. The notch filter frequency range in the CDMA broadband channel may be approximately 30 kHz to 60 kHz wide. Other broadband channels may tolerate different notch sizes.

FIGS. 2A-2C and 3A-3C depict various embodiments of methods for determining narrowband candidate frequency ranges that potentially contribute to intermodulation interference experienced at a narrowband signal receiver and selectively removing the energy in the narrowband candidate frequency ranges to substantially eliminating the intermodulation interference. According to one embodiment shown in FIG. 2A, the carrier frequency signal 114 may include at least one broadband transmit signal transmitted on a second channel frequency 210 in a second allocated spectrum 202. In operation, the transmitter 100 receives an indication that a narrowband signal receiver operating on a first channel frequency 209 in a first allocated spectrum 201 is experiencing intermodulation interference 204. The intermodulation interference 204 may have a frequency 208 substantially equal to the first channel frequency 209. The radio signal transmitter 100 may then determine narrowband candidate frequency ranges 213 in the at least one broadband transmit signal on the second channel frequency 210 of the second allocated spectrum 202 that linearly combine into frequencies that overlap the first channel frequency 209. The radio signal transmitter 100 may then selectively filter each narrowband candidate frequency range 213 of the at least one broadband transmit signal until the intermodulation interference 204 is substantially eliminated.

According to one embodiment, the intermodulation interference 204 may be caused in part by at the least one broadband transmit signal from the radio signal transmitter 100 operating on a second channel frequency 210 in a second allocated spectrum 202. The intermodulation interference 204 may be caused by linear combinations of harmonics of the at least one broadband transmit signal and harmonics of at least one transmit signal in a third allocated spectrum 203. The frequency of intermodulation interference is calculated as a linear combination of all harmonics that contribute to the interference. For example, the frequency 208 of intermodulation interference 204 may be calculated as $$f_{208}=2 \cdot f_{213}-1 \cdot f_{211}, \qquad (1)$$

wherein $f_{208}$ is the frequency 208 of the intermodulation interference 204 experienced by the narrowband signal receiver operating on the first channel frequency 209, $f_{213}$ is the center frequency of a narrowband frequency range 213 in the second allocated spectrum 202, $f_{211}$ is a channel frequency 211 in the third allocated spectrum 203. The order of intermodulation interference is calculated as the sum of all orders of the harmonics that contribute to the interference. For example, the order of intermodulation interference 204 shown in (1) is equal to three, since the intermodulation interference 204 is cause by a second order harmonic (2·f2) of the frequency 213 and a first order harmonic (1·f3) of the channel frequency 211. A linear combination of other harmonics may yield intermodulation interference of a different order such as a second order, a forth order, or a higher order.

According to a further embodiment, the transmitter 100 determines the narrowband candidate frequency range that contribute to intermodulation interference 204 by performing a mapping between the second allocated spectrum 202 and the first allocated spectrum 201. According to one embodiment shown in FIG. 2A, the mapping maps the first channel frequency 209 at which intermodulation interference 204 is experienced at the narrowband signal receiver onto the second allocated spectrum 202, based on linear combinations of the first channel frequency 209 and channel frequencies in a third allocated spectrum 203. The linear combinations may be derived from a relationship substantially similar to the one shown in equation (1). From the equation, for example, the first channel frequency 209 may be mapped onto a frequency 212 in the second allocated spectrum 202 by calculating $$f_{212}=(f_{209}+f_{211})/2, \qquad (2)$$

wherein $f_{212}$ is the frequency 212 in the second allocated spectrum.

In this example, the frequency 212 mapped from the channel frequency 209 corresponds to a narrow band frequency range 213 in the second channel frequency 210 in the second allocated spectrum 202.

Figure 3C:
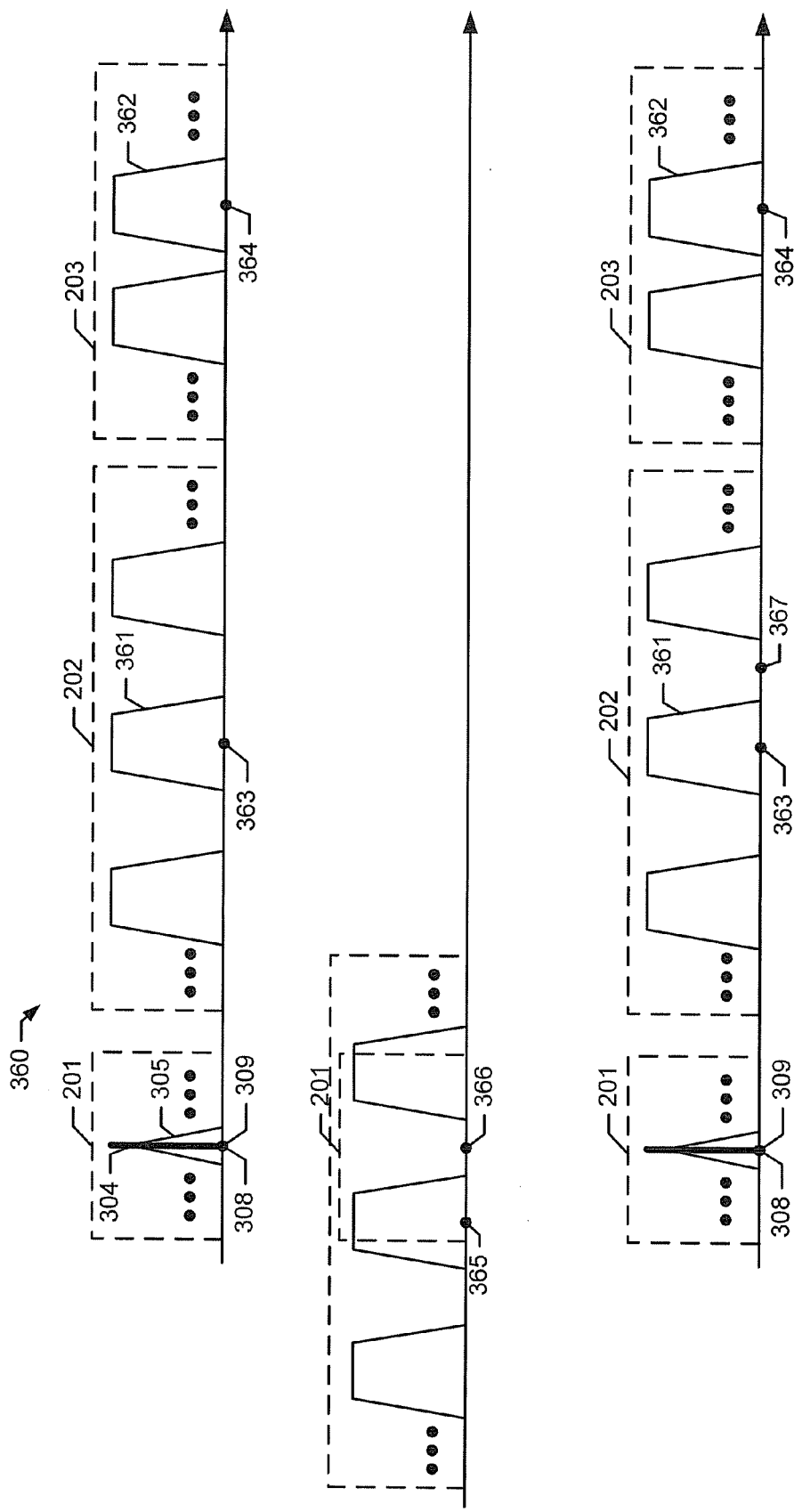
FIG. 3C depicts an alternative embodiment wherein a frequency in the second allocated spectrum is mapped to the first allocated spectrum.

According to another embodiment shown in FIG. 2C, the first channel frequency 209 at which the intermodulation interference 204 is being experienced may be mapped onto another frequency 264 in the second allocated spectrum 202. In this embodiment, the mapping from the first channel frequency 209 to the frequency 264 is based on the linear combination of the first channel frequency 209 and another channel frequency 263 in the third allocated spectrum 203. The linear combination may be substantially similar to that shown in (2) or may be a different linear combination derived from intermodulation interference of a different order such as a second order, a forth order, or a higher order. Thus, the first channel frequency 209 may also be mapped onto a frequency 264 in the second allocated spectrum 202 by calculating $$f_{264}=(f_{209}+f_{263})/2, \qquad (3)$$

wherein $f_{264}$ is the frequency 264 in the second allocated spectrum. Furthermore, as shown in FIG. 3C, the frequency 264 mapped from the first channel frequency 209 corresponds to a frequency 265 that does not fall onto any broadband channel frequency in the second allocated spectrum 202. Thus, frequency 265 is not a candidate for causing intermodulation distortion on the channel at frequency 209.

According to a further embodiment, the transmitter 100 may further determine the narrowband candidate frequency ranges that may potentially cause the intermodulation interference 204 by selecting within the channel frequencies in the second allocated spectrum 202 all narrowband frequency ranges that correspond to the first channel frequency 209 based on the mapping. Those narrowband frequency ranges such as the narrowband frequency range 264 that does not fall onto any channel frequency in the second allocated spectrum are not selected as the narrowband candidate frequency ranges that may potentially cause the intermodulation interference 204.

According to yet another embodiment shown in FIG. 2B, after determining the narrowband candidate frequency ranges, the transmitter 100 may then selectively remove the energy of the narrowband candidate frequency ranges determined according to the embodiment depicted in FIG. 2A. To remove the energy of the narrowband candidate frequency ranges, the transmitter 100 may apply at least one notch filter to the broadband transmit signal. As depicted in FIG. 2B, the center frequency of the at least one notch filter is adjusted to a frequency 231 substantially equal to the center frequency of the narrowband candidate frequency range 213. The at least one notch filter is applied to each of the narrowband candidate frequency ranges consecutively until the intermodulation interference 204 is substantially eliminated. As the example depicted in FIG. 2B, after the at least one notch filter is applied to the narrowband frequency range 213, the energy within the narrowband candidate frequency range 213 is substantially removed and consequently the intermodulation interference 204 in the first channel frequency 209 is significantly reduced.

According to another embodiment, the broadband signal transmitter may use an alternative mapping to determine the narrowband candidate frequency ranges. The alternative mapping may map the second allocated spectrum 202 to the first allocated spectrum 201 by calculating a plurality of linear combinations of occupied channel frequencies in the second allocated spectrum 202 and the third allocated spectrum 203. For example, in FIG. 3A, the mapping may be derived from the relationship shown in (1) such that $$f_{312}=2 \cdot f_{310}-1 \cdot f_{311}, \quad (3)$$

Wherein $f_{312}$ is the resulting channel frequency in the first allocated spectrum 201, $f_{310}$ is the occupied channel frequency 310 in the second allocated spectrum 202, and $f_{311}$ is the occupied channel frequency 311 in the third allocated spectrum 203. According to this example, the resulting frequency range 313 substantially equal to a channel frequency 309 at which the intermodulation interference 304 is being experienced. Furthermore, the frequency range 314 corresponding to the resulting frequency range 313 in the resulting channel frequency 312 may fall into the occupied channel frequency 310 in the second allocated spectrum 202.

According to another embodiment shown in FIG. 3C, the occupied channel frequencies 363 in the second allocated spectrum 202 may be mapped to channel frequencies 365 in the first allocated spectrum 201 by calculating the linear combination of the second allocated spectrum 202 and another channel frequency 364 in the third allocated spectrum 203. The mapping may be substantially similar to the one shown in (3). Alternatively, the mapping may also be derived from intermodulation interference of a different order such as a second order, a forth order, or a higher order. As depicted in FIG. 3C, a resulting frequency range 366 substantially equal to the channel frequency 309 at which intermodulation interference 304 is being experienced. Furthermore, a frequency range 367 corresponding to the resulting frequency range 366 may not fall into any occupied channel frequency in the second allocated spectrum 202.

According to a further embodiment, the transmitter 100 may further determine the narrowband candidate frequency ranges that may potentially cause the intermodulation interference 304 by selecting within the occupied channel frequencies in the second allocated spectrum 202 all narrowband frequency ranges that correspond to the channel frequency 313 based on the linear combinations. Those narrowband frequency ranges such as the narrowband frequency range 367 that does not fall onto any occupied channel frequency in the second allocated spectrum 202 are not selected as the narrowband candidate frequency ranges.

According to one embodiment, the mapping between the second allocated spectrum 202 and the first allocated spectrum 201 may be calculated by a computer utility at real time upon receiving the indication of the occurrence of the intermodulation interference. According to another embodiment, the mapping may also be calculated beforehand and saved as a look-up table on a storage device. Upon receiving the indication of the occurrence of the interference, the narrowband channel frequency at which the intermodulation interference is being experienced is used to perform a search in the pre-calculated look-up table to determine the narrowband candidate frequency ranges.

FIGS. 4A and 4B depict two embodiments of methods for substantially mitigating intermodulation interference at a narrowband signal receiver operating on a first channel frequency in a first allocated spectrum. According to one embodiment, the intermodulation interference may be caused in part by at least one broadband transmit signal from a radio signal transmitter operating on a second channel frequency in a second allocated spectrum. The intermodulation interference may also be caused in part by at least one transmit signal in a third allocated spectrum. The intermodulation interference has a frequency substantially equal to a center frequency of the narrowband signal receiver.

According to one embodiment shown in FIG. 4A, the method 400 for mitigating intermodulation interference at a narrowband signal receiver includes receiving an indication of the occurrence of intermodulation interference at the narrowband signal receiver (block 402), mapping the first channel frequency at which the intermodulation interference is being experienced to the second allocated spectrum based on linear combinations of the first channel frequency and channel frequencies in a third allocated spectrum (block 404), determining narrowband candidate frequency ranges within the at least one broadband transmit signal of the second channel frequency of the second allocated spectrum that linearly combine into frequencies that overlap the first channel frequency (block 406), and selectively filtering each narrowband candidate frequency range of the at least one broadband transmit signal until the intermodulation interference is substantially eliminated (block 408).

According to an embodiment shown in FIG. 4B, the method 420 for mitigating intermodulation interference at a narrowband signal receiver may include calculating a plurality of linear combinations of occupied channel frequencies in the second allocated spectrum and occupied channel frequencies in a third allocated spectrum to determine those combinations that contain frequencies that overlap all or a part of the first channel frequency in the first allocated spectrum (block 424). According to another embodiment, the method 420 may also include identifying in the second allocated spectrum frequencies corresponding to the linear combinations substantially equal to the frequency of the narrowband signal receiver The selective filtering is performed by at least one notch filter within the radio signal transmitter operating on the second channel frequency. The at least one notch filter may be a digital filter, an analog baseband filter, a baseband analog filter, an analog IF filter, or an analog RF carrier filter. The at least one notch filter has a center frequency, wherein each center frequency may be adjusted independently by a manual means or by a computer processor running a computer program. The at least one notch filter may be independently applied within the radio signal transmitter to signals at an input of a D/A converter, an input of an IF frequency converter, an output of an IF frequency converter, or an input of a power amplifier.

Embodiments of methods and apparatuses have been described above. Those skilled in the art will appreciate that changes may be made to the embodiments described without departing from the true spirit and scope of the invention as defined by the claims.

We claim:

1. A method comprising:
   receiving an indication that a narrowband signal receiver operating on a first channel frequency in a first allocated spectrum is experiencing intermodulation interference caused in part by at least one broadband transmit signal from a radio signal transmitter operating on a second channel frequency in a second allocated spectrum;
   determining narrowband candidate frequency ranges within the at least one broadband transmit signal of the second channel frequency of the second allocated spectrum that linearly combine into frequencies that overlap the first channel frequency; and
   selectively filtering each narrowband candidate frequency range of the at least one broadband transmit signal until the intermodulation interference is substantially eliminated, wherein determining narrowband candidate frequency ranges comprises determining a mapping between the second allocated spectrum and the first allocated spectrum, wherein the mapping maps the first channel frequency into the second allocated spectrum based on linear combinations of the first channel frequency and channel frequencies in a third allocated spectrum.

2. The method of claim 1, wherein the intermodulation interference is caused in part by at least one transmit signal in the third allocated spectrum.

3. The method of claim 1, wherein the intermodulation interference has a frequency that is substantially equal to a center frequency of the narrowband signal receiver.

4. The method of claim 1, wherein determining the narrowband candidate frequency ranges within the second allocated spectrum is performed by a computer program running on a computer processor in response to the first channel frequency and the second channel frequency.

5. The method of claim 1, wherein the selective filtering is performed by at least one notch filter within the radio signal transmitter operating on the second channel frequency.

6. The method of claim 5, wherein the at least one notch filter is selected from a group comprising:
a digital filter;
an analog baseband filter;
an analog IF filter; and
an analog RF carrier filter.

7. The method of claim 5, wherein the at least one notch filter has a center frequency, the center frequency being adjusted by a manual means or by a computer processor.

8. The method of claim 7, wherein the at least one notch filter is independently applied within the radio signal transmitter to signals at a point selected from a group comprising:
an input of a D/A converter;
an input of an IF frequency converter;
an output of an IF frequency converter;
an input of a power amplifier;
an output of a power amplifier.

9. A method comprising:
receiving an indication that a narrowband signal receiver operating on a first channel frequency in a first allocated spectrum is experiencing intermodulation interference caused in part by at least one broadband transmit signal from a radio signal transmitter operating on a second channel frequency in a second allocated spectrum;
determining narrowband candidate frequency ranges within the at least one broadband transmit signal of the second channel frequency of the second allocated spectrum that linearly combine into frequencies that overlap the first channel frequency; and
selectively filtering each narrowband candidate frequency range of the at least one broadband transmit signal until the intermodulation interference is substantially eliminated, wherein determining narrowband candidate frequency ranges comprises calculating a plurality of linear combinations of channel frequencies of occupied channels in the second allocated spectrum and occupied channels in a third allocated spectrum to determine those combinations that contain frequencies that overlap all or a part of the first channel frequency in the first allocated spectrum.

10. The method of claim 9, further comprising identifying in the second allocated spectrum frequencies corresponding to the linear combinations substantially equal to the first channel frequency of the narrowband signal receiver.

* * * * *